United States Patent
Palmer

[19]

[11] Patent Number: 5,295,139
[45] Date of Patent: Mar. 15, 1994

[54] MANAGEMENT SYSTEM FOR PARTITIONED MULTI-BANDWIDTH COMMUNICATIONS NETWORK

[75] Inventor: Craig A. Palmer, The Colony, Tex.
[73] Assignee: DSC Communications Corporation, Plano, Tex.
[21] Appl. No.: 792,410
[22] Filed: Nov. 15, 1991
[51] Int. Cl.⁵ .................. H04L 12/56; H04L 12/12
[52] U.S. Cl. ......................... 370/60; 370/60.1; 370/68.1; 370/110.1
[58] Field of Search ............ 370/60, 60.1, 94.1, 370/94.2, 85.13, 85.14, 68.1, 110.1, 58.1, 58.2, 58.3

[56] References Cited
U.S. PATENT DOCUMENTS
4,713,806 12/1987 Oberlander et al. ............ 370/110.1
5,043,875 8/1991 Hall ................................. 370/68.1

Primary Examiner—Wellington Chin
Attorney, Agent, or Firm—Baker & Botts

[57] ABSTRACT

A management system for a partitioned multi-bandwidth communications network, i.e., a network in which end users are allocated virtual networks of limited bandwidth residing on lines of larger bandwidth. The management system includes a central management computer for use by network operators in communication with local terminals for use by end users. Tasks such as configurations for new circuits may be requested by the central operators as well as by the end users. Such requests are specified in terms of abstract logical objects, and the management system is programmed to correlate these logical objects to actual physical devices that comprise the circuit. The correlation programming is bi-directional so that in the case of a task such as failure detection, the management system may automatically correlate a failed physical object to a logical object for replacement.

22 Claims, 6 Drawing Sheets

MANAGEMENT SYSTEM FOR PARTITIONED MULTI-BANDWIDTH COMMUNICATIONS NETWORK

RELATED PATENT APPLICATIONS

The following patent applications are related to this application, in that they deal with different aspects of a management system for a multi-bandwidth communications network. Specifically, they deal with scheduling and accounting functions in which the management system deals with changing physical connections. Both have been assigned to DSC Communications Corporation. These applications were filed on Apr. 10, 1990, and are hereby incorporated in this patent application by reference.

| U.S. Pat. No. | Title |
| --- | --- |
| 07/507,594 Filed April 10, 1990 | Network Controller Scheduling System and Method of Operation |
| 07/507,363 Filed April 10, 1990 | Network Controller Billing System and Method of Operation |

TECHNICAL FIELD OF THE INVENTION

This invention relates to telephone communications systems, and more particularly to managing transmission networks that provide different bandwidths and permit a user to configure the bandwidth available to it according to a current need.

BACKGROUND OF THE INVENTION

In digital data communications, the transmission speed of the communications link from one node to another is one of the main factors in the bandwidth. To improve efficiency, systems using various bandwidths (at different transmission speeds) have been made available.

A number of carrier systems having different bandwidths are available from common carriers, such as AT&T. These systems include T1, T1C, T2 and other systems, each of which is associated with a specific data transmission rate. For example, the T1 system is associated with a 1.544 Mbps data rate, also referred to as the DS1 rate, and provides up to 24 combined data and PCM voice channels. The T2 carrier system is associated with a 6.132 Mbps data rate (DS2), and provides 96 channels. The FT3 system is an optical fiber carrier system with a 44.736 Mbps (DS3), and provides 672 channels. A single channel voice grade line is referred to as a DS0 line.

A recent development in data communications has been systems in which different units of equipment associated with different bandwidths are linked in the same network. For example, DS0 equipment might be integrated with DS1 or DS3 equipment, with all equipment being managed by a single management system. Networks that manage or integrate equipment for different bandwidths are referred to as "multi-bandwidth systems".

Another recent development in data communications has involved new system management techniques for the benefit of multiple network subscribers. One new technique is the partitioning of bandwidths, in which the bandwidth service provider allocates the bandwidth in a network among different subscribers. Each subscriber's portion of the network is referred to as its "private virtual network".

Often in partitioned systems, the service provider manages a bandwidth pool. From this pool, each subscriber is allocated a certain permanent bandwidth, but if for some reason, that bandwidth is temporarily unavailable or insufficient, the subscriber's portion of the network may be reconfigured from a pool of unallocated bandwidth.

The more innovative partitioned bandwidth systems give each subscriber the ability to control the bandwidth assigned to it by the service provider. Typically, the subscriber has a computer terminal with access to a management system. One type of management system for partitioned networks, referred to as a "customer controlled configuration" system, permits the subscriber to change the bandwidth available to it. The result is an economic savings in that the customer need not pay for more bandwidth than is needed at a given time. A problem with such existing systems, however, is that at the central management level, changes in the physical elements of each customer's virtual network make maintaining records of each customer's network difficult.

A characteristic of today's management systems for partitioned, multi-bandwidth, networks is the need to tie equipment together using physical device identifiers. In other words, the management system defines connections through different bandwidths in terms of specific physical components. However, from the service provider's point of view, record keeping and restoration is complicated. From a subscriber's point of view, the need for a physical representation of the network requires that network configurations be performed by someone specially knowledgeable about the physical network components.

The increasing use of partitioned, multi-bandwidth, networks calls for improved management methods. Ideally, a partitioned multi-bandwidth system should permit each subscriber to directly implement bandwidth requests, without the need to make requests at a central administrative level. Also, the system must not be overly complicated from the subscriber's point of view. A need has arisen for management systems which provide the ability to reconfigure the physical network resources managed by the system without impacting the user's perspective of the network, or in other words, the ability to provide transparency. Further, a need has arisen for such a management system which selectively enables such transparency at any network resource or user-subscriber level in the network hierarchy.

SUMMARY OF THE INVENTION

The invention has apparatus and method aspects, and includes a management system for a partitioned multi-bandwidth communications network. The present invention encompasses the use of a network system with three layers, unlike prior systems, which have only two layers —a physical layer which represents the physical network configuration and a status and logical layer used by the application for user configuration. In accordance with the present invention, another logical layer is added between the prior physical and logical layers. The additional layer permits the network management system to isolate the configuration records and application functions/objects from physical network activity, such as restoration or grooming. As a result, major changes can take place in the physical network, but be selectively transparent to the administrator, the application and the users. Further, the level of visibility required when traversing multiple layers of bandwidth is reduced significantly by the present technique, a key to a successful multi-bandwidth end user services platform.

In further accordance with the invention, a central management computer is programmed to establish virtual networks of the communications network. In addition to performing usual applications tasks, the programming includes correlation programming that correlates logical objects representing classes of network elements to physical objects representing network elements, such that it translates virtual circuit definitions in terms of said logical objects to physical resources and/or objects, such as lines, using appropriate cross connect elements of the network. Communications links between the central management computer and cross connect elements of the communications network deliver these connection commands. At least one terminal is accessible to an end user of a virtual network for receiving virtual circuit requests from the end user. These end user requests are in terms of the above logical objects, i.e., a circuit having a certain capacity and end points. Communication means between the central computer and the terminal communicate such requests to the central computer so that the requested end user circuit can be implemented.

The correlation programming between logical and physical objects is used for many management applications. Restoration, as well as configuration, is simplified. A technical advantage of the invention is that network subscribers may specify their network service in terms of bandwidth and end points. The subscriber is not required to deal with physical attributes of the circuit. This capability permits the subscriber to have improved primary control over management applications such as bandwidth configuration. Major changes can occur in the physical network of the present invention, such as for restoration and grooming, that may be selectively transparent to the network administrator or the subscriber. Yet, if desired, the network administrator can track changes at any level of detail.

The management system provides a tool-oriented approach that permits the support of various types of bandwidth and applications with little or no changes to the core system. Further, in a restoration scenario, the present concept allows a large portion of bandwidth to fail and be replaced with very few changes to the record system and no substantial effect on the subscriber from a configuration perspective, except the time required for an equipment swap.

DETAILED DESCRIPTION OF THE INVENTION

For purposes of this description, "multi-bandwidth" network refers to a network in which one or more circuits is carried by more than one level of bandwidth, with all bandwidths being managed concurrently. For purposes of example, this description discusses a network having DS0, DS1, and DS3 facilities. However, the management system described herein could be used with other bandwidths, such as the more recently developed optical transmission bandwidths.

In multi-bandwidth network terminology, a special terminology describes various physical network elements. A "cross-connect" is a switch that makes connections between lines of two different bandwidths. For example, a 1/0 cross-connect makes connections between DS1 and DS0 lines. A "facility" is a communications link that directly connects two cross-connect units, or that connects a cross-connect unit to off-network equipment. For example, a DS1 facility might be used between two 1/0 cross-connects. A "circuit" is an end-to-end connection between two or more terminal facilities, and is defined by a list of end points, cross-connections, and facilities that make up the circuit's path. Other physical elements are described below in connection with the "object" identifiers used by the management system described herein.

SYSTEM OVERVIEW

Figure 1:
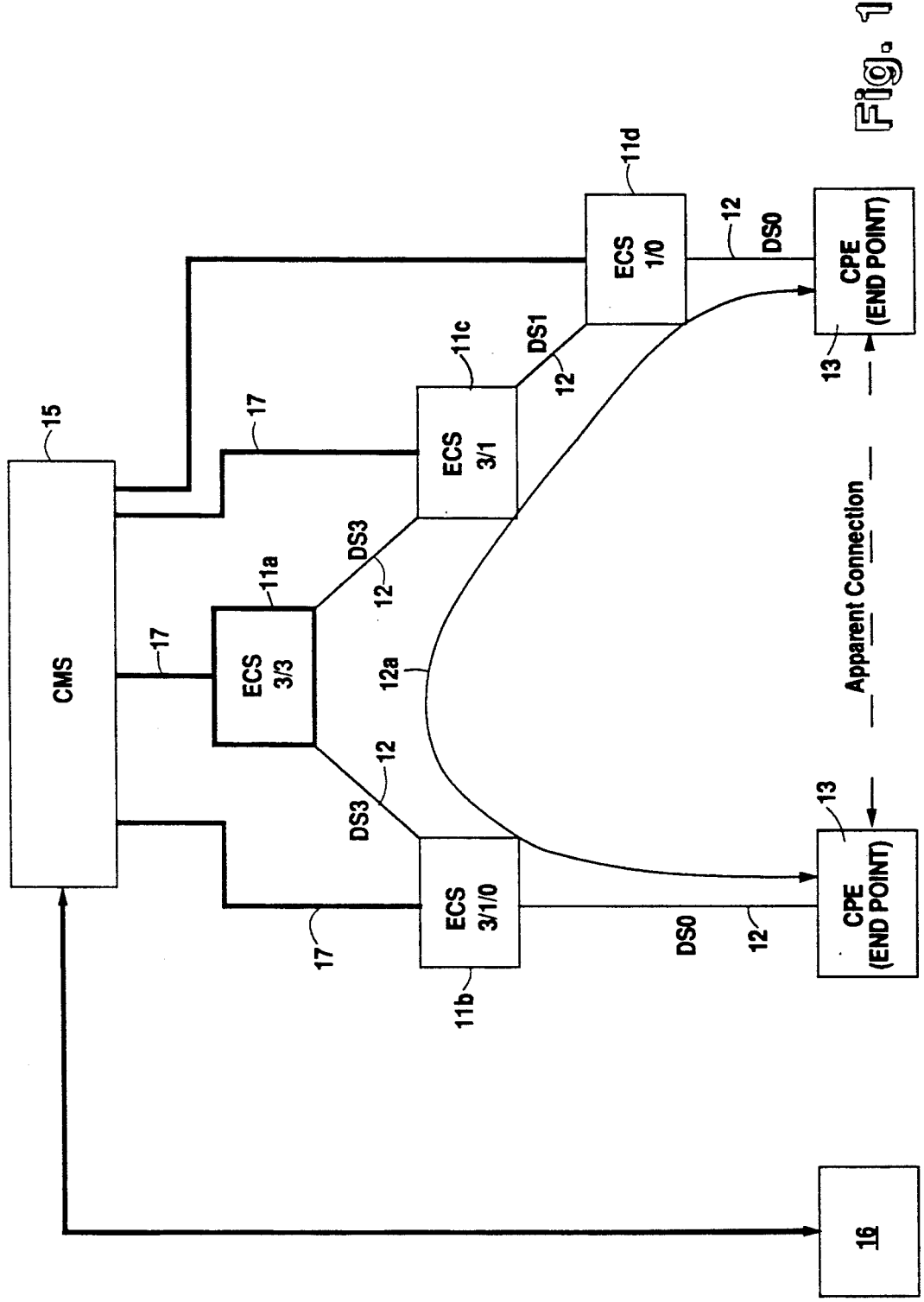
FIG. 1 illustrates an example of a partitioned communications network from an end user's point of view.

FIG. 1 illustrates an example of physical elements of a multi-bandwidth network. The network is shown from the point of view of a single end user, who has been partitioned some of the network bandwidth. The bandwidth available to this user resides on the depicted physical components, which comprise its virtual network.

The transmission components of the network include a number of electronic cross-connect switches (ECS's) 11a-11d, communication facilities 12, and customer premise equipment (CPE) or end point units 13. The network of FIG. 1 is actually a network within a network, in that a 3/1 carrier network resides within a 3/3 backbone network. This configuration is for purposes of example, and any other cross-connect network configuration may be used. Also, the network of FIG. 1 could include, or be completely comprised of a number of other types of communications equipment, such as are used for Synchronous Optical Networks (SONET) or Integrated Services Digital Network (ISDN). As communications technology advances, communications networks are being developed that integrate these types of equipment into multi-bandwidth networks.

As stated above, FIG. 1 is intended to illustrate only one end user's virtual network, although it is assumed that more than one end user may have use of at least some of the ECS's 11a-11d and facilities 12. For the network of FIG. 1, where DS0 and DS1 circuits are carried by DS3 facilities, there could be up to 672 DS0 end users, i.e., virtual circuit owners.

ECS's 11a-11d provide cross connections for facilities 12. For example, ECS 11a connects DS3 facilities to DS3 facilities, and is thus referred to as a 3/3 switch. ECS 11d connects DS1 facilities to DS0 facilities. In this manner, ECS switches 11a-11d permit a multi-bandwidth environment by providing connections among facilities 12 associated with different bandwidths.

Customer premise equipment (CPE) units 13 include telephone, computer terminals, and pbx systems, or other voice or data communications equipment. These devices originate and receive the data to be communicated. CPE units 13 also include multiplexion units, which permit bandwidth control of the end user's own equipment.

The management system of the network of FIG. 1 has both a central management system (CMS) 15 and local user stations 16. Thus, the management system has two types of "users": the personnel associated with the carrier or other network operator, who provide the central management for the entire network, and the end users, i.e., the virtual network owners, at each user station 18.

CMS 15 communicates with each ECS 11a–11d via communications links 17. In general terms, CMS 15 is a computer system programmed to centrally control a network of intelligent network elements, such as ESC's 11a–11d, and to also permit limited control via terminals at user stations 16. The hardware of CMS 15 may be any conventional computer that will support local server units, such as the VAX system manufactured by Digital Equipment Corporation.

The specific tasks of CMS 15 include various administrative and application tasks, such as configuration, fault detection and diagnosis, billing, reporting, maintenance, and provisioning. Provisioning informs each ECS 11a–11d about the characteristics of the facilities 12 it connects. Configuration involves establishing a link between two nodes. For configuring a circuit, either a network operator or a local user requests the desired circuit, and CMS 15 sends commands to all affected nodes. Reconfiguration is performed when there is a change to the facilities 12 to be used by an end user, and may be required for a number of reasons, such as equipment failure, growth, or change of service. Thus, it may be on demand by the end user, as in the case of a permanent or temporary increase or decrease in need, or automatic, as in the case of equipment failure. In the latter situation, reconfiguration is also referred to as restoration. An aspect of configuration is "grooming", in which the CMS 15 is programmed to configure circuits in the most efficient manner.

Although the present embodiment will be described in conjunction with performing reconfiguration or grooming wherein connection commands are generated, it will be understood that the present invention is also useful for functions such as surveillance, wherein connection commands may not necessarily be generated nor required.

Each end user has access to a user station 16, which is in communication with CMS 15 for the purpose of communicating control information. Each user station 16 permits the user to configure its virtual network and thereby directly control the bandwidth allocated to it. For example, an end user may use a smaller bandwidth during certain parts of the day when its communication needs are less. In a commonly used approach to customer controlled configuration, extra bandwidth needed at any one time for an end user might be provided from a bandwidth pool.

Both types of users of the management system perform various tasks involving network configuration. When configuring network circuits, eventually, a sequence of specific channels and lines must be defined for each circuit. This physical definition is best illustrated by example, such as a connection of a DS0 line at node A to a DS0 line at node B. From node A, the DS0 line might be linked to channel 24 of DS1 line 5, and DS1 line 5 is channel 14 of DS3 line 42. Then, DS3 line 42 connects to channel 12 of DS1 line 4, which connects to the DS0 line at node B. Bidirectional path 12a indicates the actual connection between the end points. A feature of the invention is that the user need not make this kind of bandwidth specification, and may instead deal with bandwidth requests at a logical level of abstraction. Thus, tasks involving configuration are performed without the need to determine and specify each circuit's sequence of physical network elements.

MANAGEMENT SYSTEM

Figure 2:
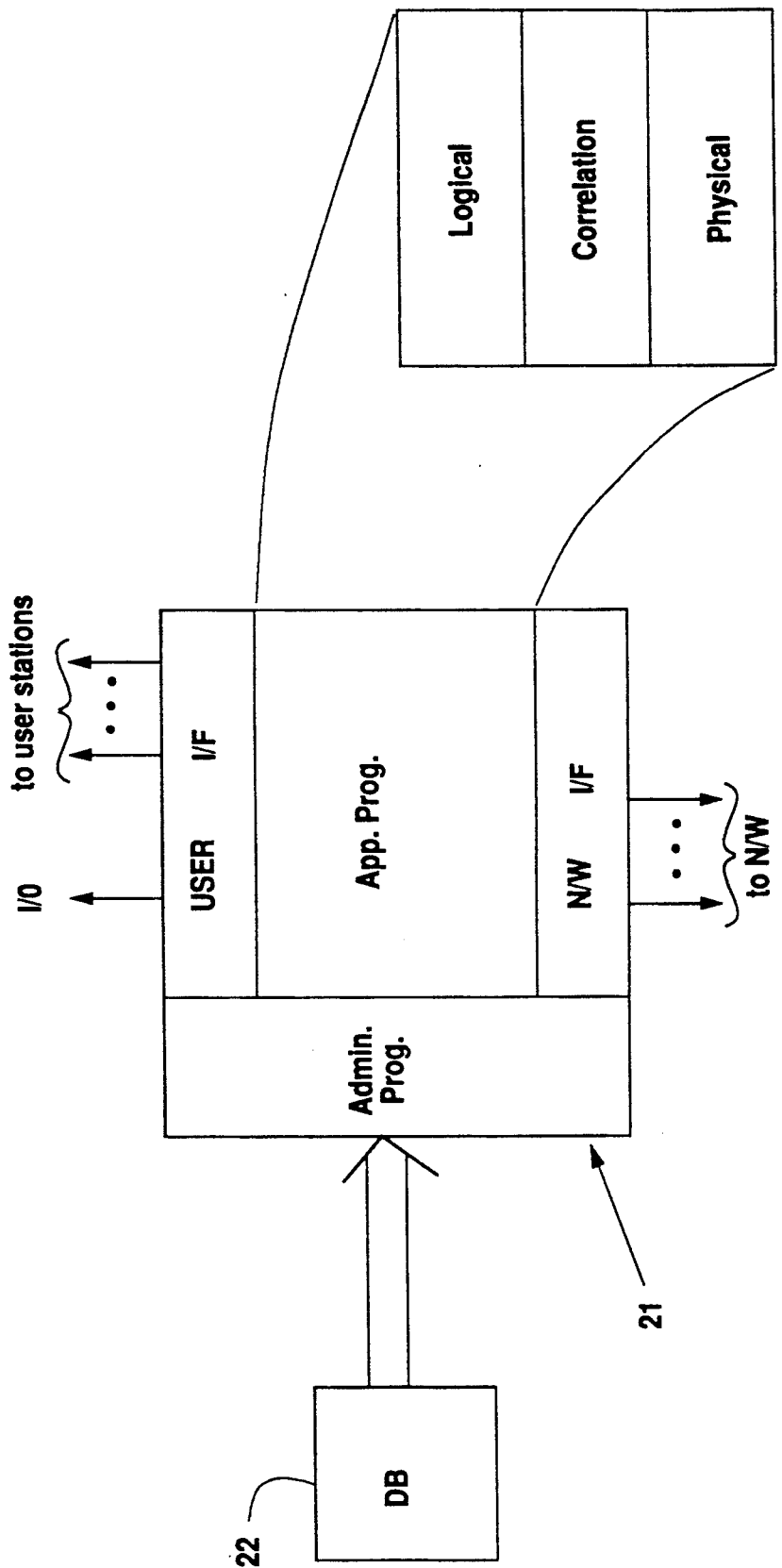
FIG. 2 illustrates the programming of the central management system of FIG. 1.

FIG. 2 is a functional block diagram of CMS 15. A processing unit 21 is programmed to perform administration and application tasks. As stated above, processing unit 2 may be any conventional computer such as a VAX. Processing unit 21 is in communication with at least one storage device 22, such as a magnetic disk, as well as random access memory 23. The storage device 22 contains a database, which stores information pertaining to the network elements and the configurations of existing virtual networks. As explained below, during various applications, CMS 15 accesses this database for the purpose of mapping logical to physical objects and for assembling objects to establish circuits.

Administration programming performs functions such as accounting for customer usage. Application programming performs the actual network services to the end user. A user interface permits communications with user stations 16 and permits input and output by the network operator. A network interpreter interfaces communications with network elements such as ECS's 11a–11d.

The user and the network operator interact with application programming, which performs the tasks described above in connection with CMS 15. The application programming operates on a data model having three different levels: a logical layer, a correlation (logical) layer, and a physical level. IN other words, CMS 15 treats the network in terms of a multi-layered model. This network model has a physical layer, in which the network's physical elements are represented by unique identifiers, and a logical layer, in which the network is represented by abstract identifiers. A correlation layer interprets these abstract identifiers, such that they are mapped to physical network elements.

Thus, the programming of CMS 15 at the physical level deals with actual network elements, i.e., physical objects. Programming at the logical level deals with abstractions, i.e., logical objects. Programming at the correlation level correlates the physical layer to the logical layer. More specifically, the correlation layer isolates application functions from physical network activity.

The approach to programming a computerized management system requires the specification of all logical and physical objects in the appropriate logical and physical layers. Most physical entities have a corresponding logical entity. The correlation process uses abstractions that concurrently support the logical and physical layers. It correlates core concepts, i.e., the bandwidth and group concepts described below, as well as logical to physical objects which reside in logical and physical layers.

Because of the correlation layer, the physical network can change in a manner that is transparent to the logical layer, and hence to the user. For example, for a bandwidth request, the user need only specify end points and the amount of bandwidth required.

Figure 3:
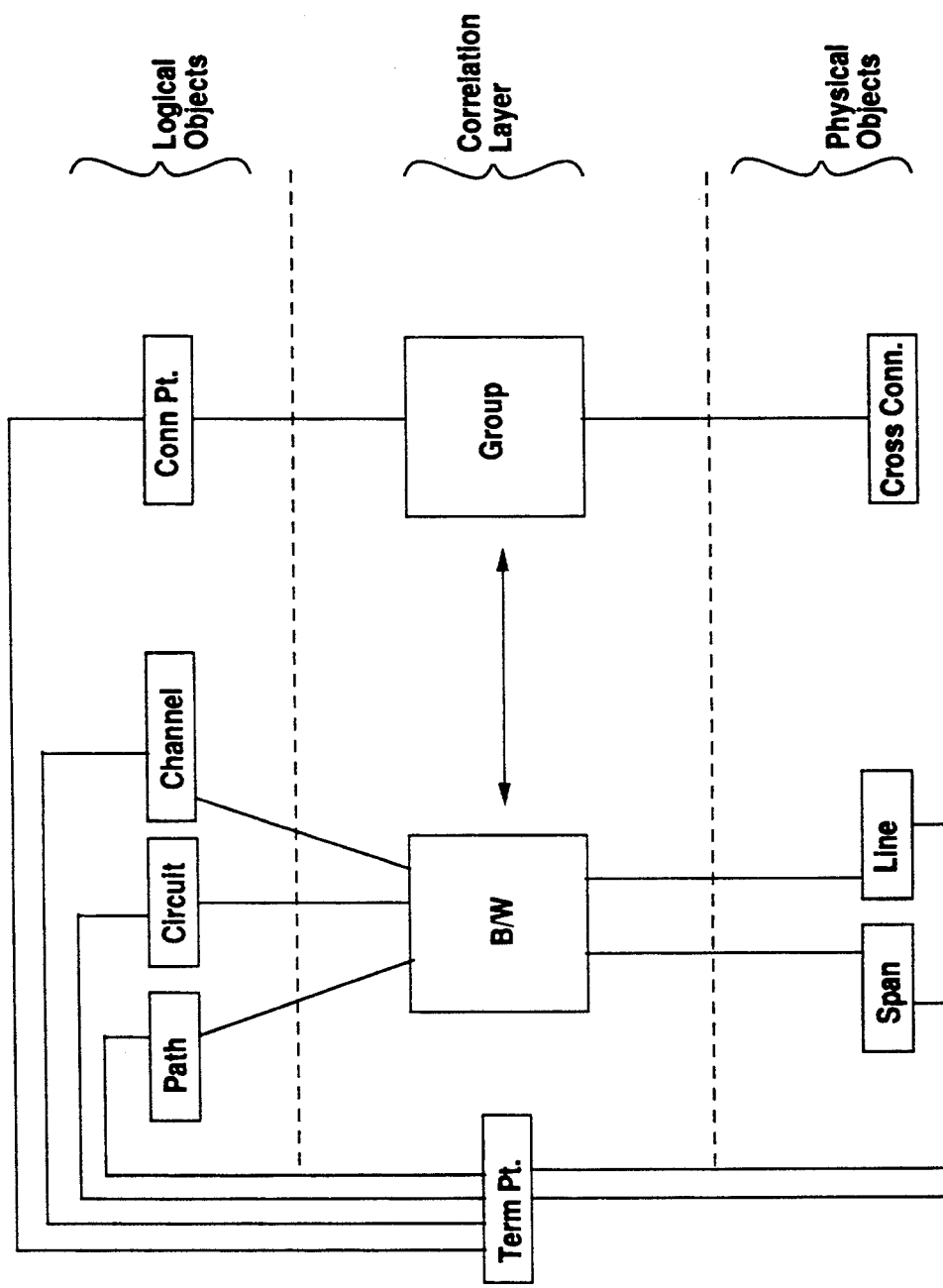
FIG. 3 illustrates the bandwidth and group object classes used by the programming of the central management system.

FIG. 3 illustrates an example of some logical and physical objects and how the application programming uses them. These objects are identified with object class identifiers, where an "object class" includes those objects that have common attributes. Logical object classes include Path, Circuit, Channel, and Connection Point, which are high-level abstractions of physical objects. Physical objects include Span, Line, and Cross-Connection, which represent the actual network elements being managed.

The correlation layer distinguishes between objects of two types: bandwidth objects and group objects. Each of these two groups includes logical and physical objects. As explained below in connection with FIGS. 4-6, correlations are made within each group and also between the two groups.

Bandwidth objects permit the transmission of information. Included within bandwidth are logical objects, i.e., paths, circuits, and channels, and physical objects, i.e., lines and spans. Bandwidth has a number of attributes, such as type, availability, termination points. Type may be data, voice, or both.

Group objects support the multiple ownership aspects of a partitioned network. Group objects include logical objects, such as cross connections, and physical objects, such as connection points. Group objects have attributes, such as bandwidth, connection points, owners, and type.

As illustrated, both the logical and the physical layers deal with representations of the same object class, Termination Point. When a user requests a particular bandwidth, it specifies the bandwidth capacity and end points at a terminal linked to CMS 15. For example, the user might request DS0 Service from end point A to end point F. The end points that begin and end a circuit are specific instances of termination points. The correlation process described herein will correlate this circuit request to a series of physical elements, that, when activated by appropriate commands, will realize the requested circuit. Typically the circuit will be bi-directional.

CORRELATION PROCESS

The following list describes object classes used in the preferred embodiment of CMS 15. Each object class has associated attributes. For example, Path is a logical object class in which all of the object instances, Paths, within the class share a common set of attributes. These objects are for purposes of example, and a comprehensive CMS 15 could include other objects and attributes.

Bridge: The "Bridge" object class is a class of support objects that provide bridging capabilities for cross-connections at DSO, DSOA, and DSOB rates. It should be noted that the object Bridge does not include the function bridging as in a broadcast connection. Bridge has the following attributes: Bridge Type, Bridge Id, Service State, and Alarm State.

Bridge Termination: The "Bridge Termination" object class is a class of managed objects that represent bridge points at which a signal is originated or terminated. Instances of this class delimit Bridges. Bridge Termination has the following attributes: Termination, Point Id, Service State, and Alarm State.

Channel: The "Channel" object class is a class of managed objects that represent portions of a Path. Instances of this class represent logical objects, called Channels, that are connections between two Channel Terminations, including the Channel Terminations themselves. A sequence of one or more channels may be linked by cross-connection, comprising a path. Several Channels can be bundled into a higher rate Path. A channel may be either uni- or bi-directional. Examples of Channels include subrates to DS0 and DS0 over DS1 paths. From an implementation perspective, Channel can be viewed as a special case of Path.

Channel has the following attributes: Channel Id, Path Name, Service State, Alarm State, A Termination, and Z Termination.

The Path Name refers to the Path of which the Channel is a part. The A Termination and Z Termination are the endpoints of the Channel, and the Alarm State and Service State provide alarm and Service-related information.

Channel Termination: The "Channel Termination" object class is a class of managed objects that represent Termination Points that delimit Channels. This object class is a subclass of the Termination Point object class. Channel Termination has the following attributes: Termination, Point Id, Service State, and Alarm State.

Circuit: The "Circuit" object class is a class of managed objects that represent the service between two or more Circuit end points. A Circuit is constructed from one or more Paths and can be Path itself. The route of a Circuit may be derived from the Paths of which it is constructed or the Lines by which it is carried. A Circuit is used to carry information between the end points of the Circuit. This class represents logical objects. A Circuit is carried over an ordered sequence of one or more Paths. The Paths that a Circuit is comprised of must be at the same rate as the Circuit. However, these Paths may be nested in Paths that are at a rate the same or higher than the Circuit. A Circuit may be uni- or bi-directional.

Circuit has the following attributes: Directionality, A Termination, Path Name List, Circuit Id, Service State, Alarm State, and Z Termination.

Directionality describes whether the Circuit is uni- or bi-directional. The Path Name List is a list of the Paths that carry the Circuit. The A Termination and Z Termination are the endpoints of the Circuit and the Alarm State and Service State provide alarm and service related information.

Connection Point: The "Connection Point" object class is a class of managed objects that provides the function of connecting together channels, Lines, and Paths to higher rate channels, Lines, and Paths. Connection Points may be used to connect a physical (Line) and/or logical (Channel and Path) objects. The objects are connected by the association of compatible termination points. The rule set for Termination Point compatibility is implementation specific. It is conceivable that a cross-connect command will not be required to support Connection Point, since the physical connection may be built into a port card.

Connection Point has the following attributes: Connection Point Id, Service State, Alarm State, and Termination Point.

Cross-Connection: The "Cross-Connection" object class is a class of managed objects that indicates an assignment relationship between two Channel Termination Points or between Channel Termination and Path Termination at the same rate, or between two or more Path Terminations at the same rate. With the exception of Bridge Termination points, Cross-Connections assign like terminations, i.e., Path to Path, Channel to Channel. Those terminations must be at the same rate. In some cases, a Line and Path may have compatible Terminations. This model does not prohibit the cross-connection of Line and Path in these cases, as that is considered an implementation issue.

Cross-Connection has the following attributes: Cross-Connection Id, Service State, and Alarm State.

Equipment: The "Equipment" object class is a class of managed objects that are contained within network elements. Equipment may be contained in other Equipment. Equipment has the following attributes: Equipment Id, Equipment Function, Location Name, Service State, and Alarm State.

Hardware: The "Hardware" object class is a class of managed objects that represent physical components of Equipment, including replaceable components. Hardware may be nested within other Hardware, thereby creating a containment relationship. Hardware has the following attributes: Hardware Id, Release, Service State, and Alarm State.

Line: The "Line" object class is a class of managed objects that represent a physical transmission medium and associated Equipment required to provide the means of transporting information between two consecutive Line Terminations. A Line is a physical connection that provides the means of moving information between two consecutive network elements; one of them originating the line signal and the other terminating it. This connection is often referred to as a transmission system and may carry a portion or all of one or more Paths. A Line may be uni-or bi-directional. A Line operates at a specific rate.

Lines differ from Paths because in addition to being physical connections, their bit rates and formats vary widely depending on technology and possibly the manufacturer. Consequently, Lines are often incompatible to the point that each Line must currently be made entirely of equipment from a single manufacturer.

Lines are often subdivided into Spans, which are delineated by the occurrence of a Central Office (CO). Spans are further subdivided into sections, which are delineated by the occurrence of regenerators.

Line has the following attributes: Directionality, A Termination, Line Id, Z Termination, Service State, and Alarm State.

Line Termination: The "Line Termination" object class is a class of managed objects that represent points at which the signal is originated and/or terminated. Instances of this class delimit Lines. This object class is a subclass of the Termination Point object class. Line Termination has the following attributes: Termination Point Id, Service State, and Alarm State.

Link: The "Link" object class is a class of managed objects that represents a collection of bandwidth between two network elements or network element locations. A Link is a logical construct which is made up of one or more, Paths, Lines, and/or Channels. A Link is used to represent the existence of bandwidth between two points in the network. Link has the following attributes: Link Id, A Termination, Z Termination, Line Name List, Path Name List, Service State, and Alarm State.

Network: The "Network" object class is a class of managed objects that are collections of interconnected telecommunications and management objects (logical or physical) capable of exchanging information. These objects have one or more common characteristic, for example, they may be owned by a single customer or provider, or associated with a specific service. A Network may be nested within another (larger) Network, thereby forming a containment relationship. Network has the attribute Network ID.

Network Element: The "Network Element" object class is a class of managed objects that represent telecommunications equipment (either groups or parts) within the Telecommunications Network that performs Network Element functions, i.e., provide support and/or service to the subscriber. Network Element has the following attributes: Network, Element Id, System Title, Alarm State, and Vendor Name.

Path: The "Path" object class is a class of managed objects characterized by a specified information/data rate that is independent of the physical means of transporting the signal. A path provides a route for the transportation of that signal. The path format is continuous (unchanged from one end of the path to the other). This connection may or may not extend beyond a single transmission system (node).

A Path is a connection between two points, independent of the equipment and media providing the physical means of transporting the signal, that enables digital signal transport at a specified rate. The format of this connection, called the path format, is typically a well defined standard.

The Path object provides many types of connections. These connections are available in server rates ranging from DS0 to DS1 to DS3 and up. Within each bit rate, a variety of formats are often available, such as Super Frame (SF) and Extended Super Frame (ESF) at the DS1 rate.

A hierarchy within the path network allows a group of similar paths to be bundled together as a new, higher rate, path. This can be seen in the grouping of 24 DS0 paths to form a DS1 path, the grouping of 28 DS1 paths to form a DS3 path, or even the grouping of multiple DS0s to form a variable bandwidth path. Instances of this class represent objects, called Paths, that are connections between two Path Terminations. A Path is carried over an ordered sequence of one or more Lines, the Lines may be at the same or higher rate as the Path. A Path may be either uni- or bi-directional.

A growing trend in the digital network is the disappearance of the distinction between paths used by the customers of the network and paths used by the network. It is no longer exclusively within the network.

Path has the following attributes: Directionality, A Termination, Channel Name List, Line Name List, Path Name List, Path Id, Z Termination, Service State, and Alarm State.

Directionality describes whether the Path is uni- or bi-directional. The Channel Name List is a list of the Names of the Channels that comprise the Path. The Line Name List is a list of the Lines that carry the Path. The A Termination and Z Termination are the endpoints of the Path. The Alarm State and Service State provide alarm and service related information, respectively.

Path Termination: The "Path Termination" object class is a class of managed objects that represent Termination points at which the Path is originated and/or terminated. Instances of the class delimit Paths. This object class is a subclass of the Termination Point object class. Path Termination has the following attributes: Termination Point Id, Service State, and Alarm State.

Software: The "Software" object class is a class of managed objects that represent logical information stored in Equipment including programs and data tables. Software may be nested within other software, thereby creating a containment relationship. Software has the following attributes: Software Id, Release, Service State, and Alarm State.

Span: The "Span" object class is a class of managed objects that represent continuous sections of a physical transmission medium, usually between repeaters/regenerators. Instances of this class are connections between two Span Terminations, including the span Terminations themselves. A Span is uni-directional; therefore a sequence of one or more pairs is required to construct a bi-directional line. Span has the following attributes: Span Id, Directionality, A Termination, Line Name, Z Termination, Service State, and Alarm State.

Span Termination: The "Span Termination" object class is a class of managed objects that represent the physical connections where a signal enters or exits equipment. Instances of this object class may provide functions such as reshaping, regeneration, optical-electrical conversion and alarm performance monitoring on the Span. Span Terminations delimit Spans. This object class is a subclass of the Termination Point object class. Span Termination has the following attributes: Termination Point Id, Service State, and Alarm State.

Termination Point: The "Termination Point" object class is a class of managed objects that delimit transport entities such as Paths, Line, Channels, or Bridges. This object class is a basic object class from which subclasses, such as Path Termination, Line Termination, Channel Termination and Bridge Termination inherit attribute types, events, and actions. Termination Point has the following attributes: Termination Point Id, Service State, and Alarm State.

Figure 4:
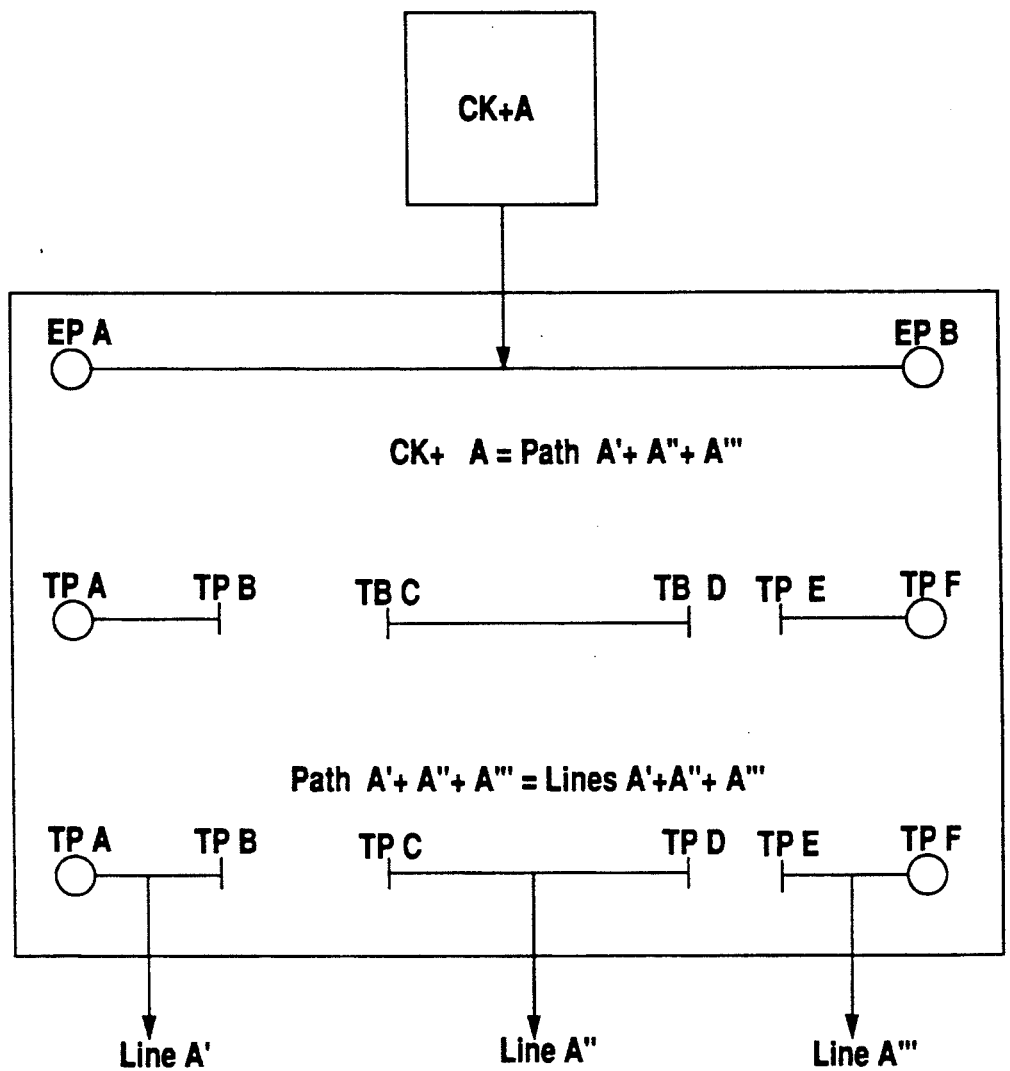
FIG. 4 illustrates the bandwidth correlations performed by the central management system.

FIG. 4 illustrates how the correlation programming of CMS 15 handles Bandwidth objects. For purposes of example, the logical objects are Circuit and Path and the physical object is Line. The user specifies end points (EP's), i.e., EP A and EP F, to define a circuit. CMS 15 then compares this circuit to a database of possible paths in database 22, and matches this circuit to a set of paths having termination points (TP's), i.e., a set of three paths from EP A to TP B, from TP C to TP D, and from TP E to EP F. The paths are identified as path A', A", and A'". As a next step of bandwidth programming functions, paths are matched to lines (facilities) having line TP's. The result of the bandwidth request is a mapping of the end-to-end circuit request to a set of physical lines and line termination points. Typically, line termination points represents cross connect switches, such as those illustrated in FIG. 1.

Figure 5:
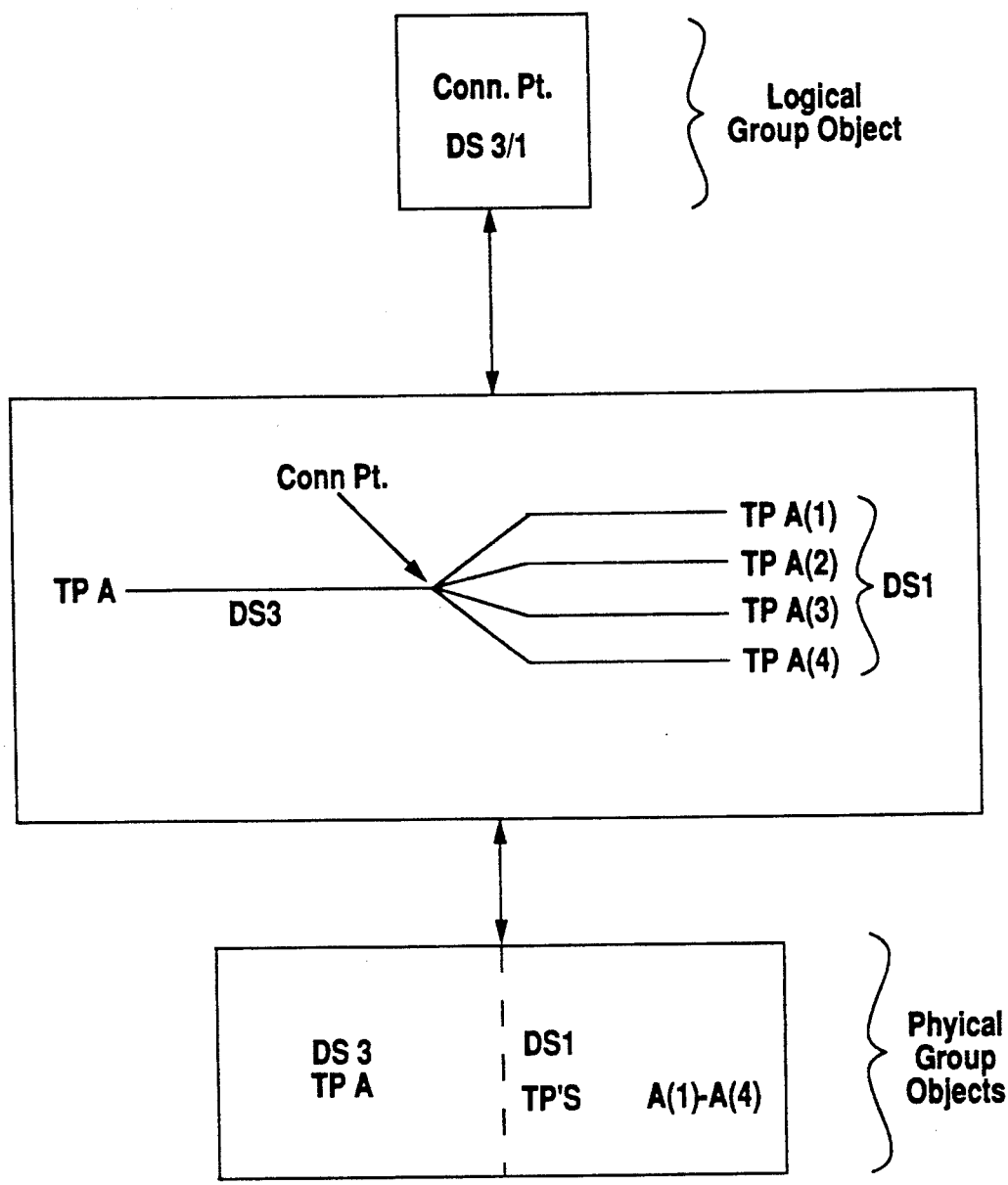
FIG. 5 illustrates the group correlations performed by the central management system.

Although FIG. 4 shows paths as an intermediate correlation, this is not necessarily the case; a path might be the same as the logical circuit. Also, although the paths of FIG. 5 are coincident with the lines, this is not necessary. For example, the two paths from EP A to TP D might be mapped to a single line having TP A' and TP D'.

For purposes of Bandwidth correlations, the bandwidths of the circuit, paths, and lines are not considered, except that the paths and lines must have a bandwidth at least as large as the requested bandwidth of the circuit. For example, for a requested DS0 circuit, some of the lines could be DS1 or DS3 lines with DS0 paths residing in them.

FIG. 5 illustrates how the correlation programming uses Group objects to tie termination points together. Typically, the lines identified in the Bandwidth correlation will include higher rate lines, such as a DS3 line, even though the user has requested a smaller bandwidth, such as a DS0 or subrate bandwidth. Using the example of FIG. 4, some part of the requested DS0 circuit might reside on a DS1 line that resides on a DS3 line. Thus for a requested circuit, the required lines have certain line termination points, where the lines may have different bandwidths.

The example of FIG. 5 illustrates a Group correlation for a bandwidth comprised of four DS1 channels that will reside on a DS3 line. At connection point X, a DS3 to DS1 cross connection is needed. The correlation programming of CMS 15 recognizes conditions such as this and performs a Group correlation of connection points to cross connections. Although not shown in FIG. 5, other Group correlations could be for connections of portions of different bandwidths. Also, more than two levels could be correlated at a single connection point, i.e., a DS3 to DS1 and DS0 correlation.

Continuing the example of FIG. 4, the correlation process determines that a DS1 path is required for at least some portion of a circuit between two end points. Thus, during the Group correlation process, the process determines that a Connection Point X exists that must provide a DS1 to DS3 connection. As indicated by FIG. 5, the logical object to be correlated in the Group correlation process is this Connection Point. The physical objects to be correlated are a set of termination point identifiers. These termination points are identified at their physical element levels, but from a logical point of view, their traversal via Connection Point X can be transparent to the user or to application programming. One of the results of the Group object correlation is a list of the cross-connections that will implement the desired circuit and that can be realized by appropriate multiplexion equipment.

Figure 6:
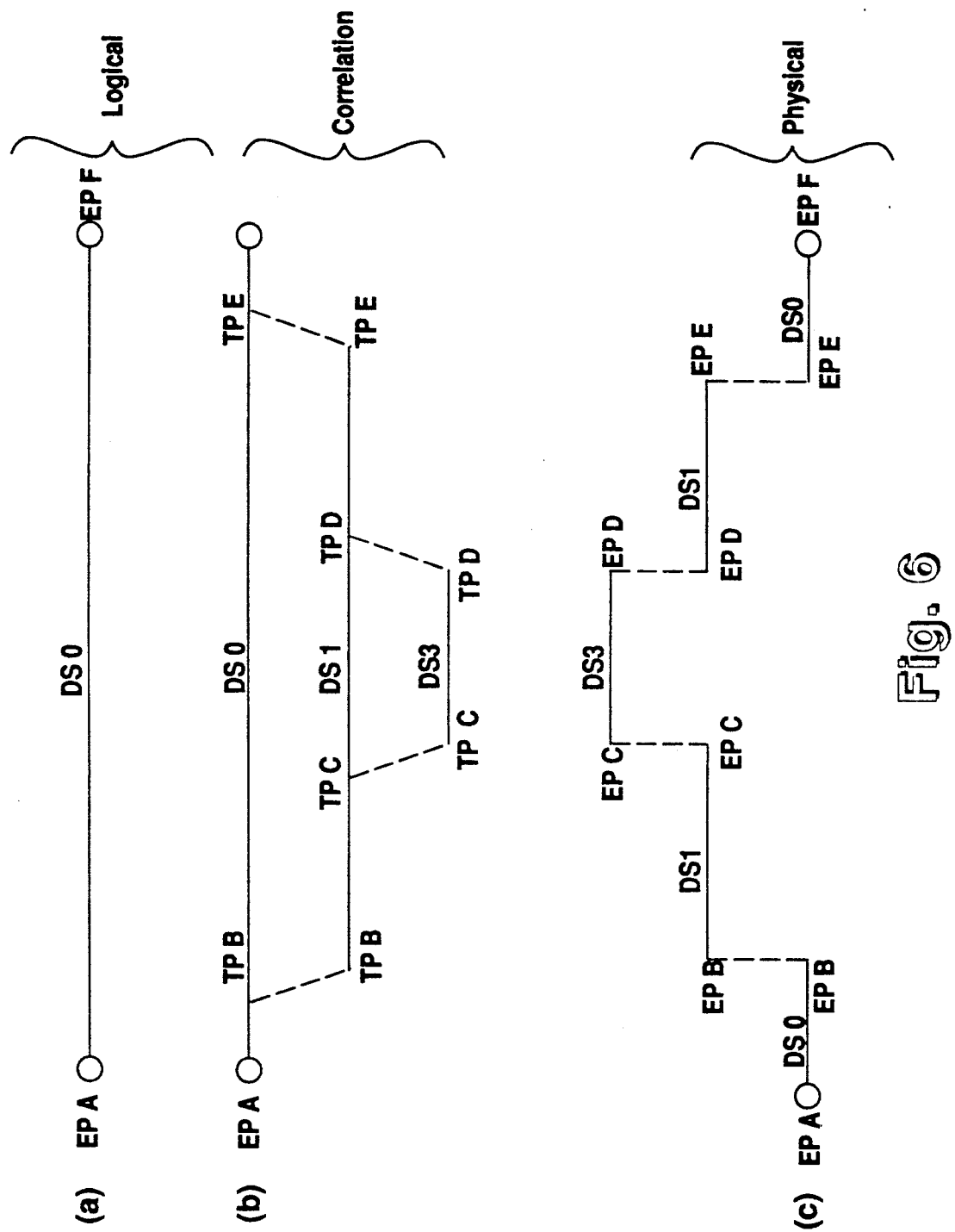
FIG. 6 illustrates the correlation of bandwidth objects to group objects.

FIG. 6 illustrates a third correlation function of the Correlation process, the correlation of Bandwidth objects to Group objects. Again, as indicated by step (a), the logical layer of the application programming deals with a circuit and its end points, which are to be correlated to a means for a physical connection.

Using the DS0/DS1/DS3 example of FIG. 4, each path having a different bandwidth level must be transitioned to the next at a termination point. As an example of a single transition, TP C represents the DS1 to DS3 connection point illustrated in FIG. 5. In step (b) of the process of FIG. 6, logical paths, i.e., the three paths representing the DS0, DS1 and DS3 paths, respectively, and their termination points are associated with bandwidth levels. In step (c), the transitions to different physical levels are defined in terms of physical lines and cross connections.

The result of the correlation process of FIG. 6 is a definition of the physical lines as well as the cross-connects, required for a complete circuit. This definition is similar to the traditional sequence of connections described above. However, because the circuit definition of FIG. 6 is multi-level, there is also at least one logical level of circuit definition that permits a circuit definition to bypass certain portions of the circuit. For example, the DS3 line of FIG. 6 could be replaced with one or more substitute DS3 lines without altering the circuit definition with respect to the DS1 and DS0 paths. Although the replacement of the DS3 lines affects 672

DS0 lines, it is not necessary to re-define 672 DS0 circuits. This transparency is selective, such that physical circuit definitions traversing multiple levels, are available if desired.

Although the foregoing description has used an end user's configuration request as an example of the three-layered application programming for CMS 15, this approach to programming CMS 15 is useful for other applications. Depending on the application, the "user" might be a network administrator or other programming. The circuit request might be triggered by a request external to CMS or by other programming that triggers the need for a change to the network.

In the case of provisioning or restoration activity, which occurs at the central level, the isolation of physical from logical objects assures the end user that its circuit definitions are not altered. So long as the end points are maintained by the new physical route, the logical definitions of the virtual circuits of the network do not change. For example a DS3 line could be re-routed without changing the DS3 definition from the end user's point of view. Also, from the network operator's point of view, the correlation layer permits physical network changes to be implemented without affecting records for tasks such as accounting.

From the network operator's point of view, CMS 15 is programmed to automatically perform tasks such as restoration. A network failure will cause an error message or "alarm," which CMS 15 detects and correlates to the physical object causing the failure. The failed physical object is then correlated to a logical replacement object or objects. For example, a failed DS3 line could be replaced with one or more DS3 lines or with one or more "stacked" DS1 lines. The failure is cured by replacing bandwidth at the DS3 level rather than by redefining each virtual circuit that might use the failed DS3 element.

For automatic network grooming, CMS 15 is programmed to maintain a current record of each virtual circuit so that bandwidth on partially used lines can be rearranged. For example, the bandwidth of three partly used DS1 lines could be rearranged to free up one of the lines. In accordance with the three-level programming of CMS 15, these changes occur at the logical level such that they are transparent to the user.

Another application of the three-level management system is an information management application, in which CMS 15 determines the physical elements associated with each current virtual circuit. This application may be used for tasks such as generating status reports or for subscriber billing. In this application, data regarding the physical circuit is used for informational purposes, as opposed to generating connection commands for new circuits.

OTHER EMBODIMENTS

Although the present invention has been described with respect to a specific, preferred embodiment, various changes and modifications may be suggested to one skilled in the art, and it is intended that the present invention encompass such changes and modifications as fall within the scope of the appended claims.

What is claimed is:

1. A management system for a partitioned multi-bandwidth communications network, comprising:
   a management computer programmed to establish virtual networks of said communications network, wherein said computer is further programmed with correlation programming that correlates logical objects representing classes of network elements to physical objects representing said network elements, such that it may translate virtual circuit definitions in terms of said logical objects to representations of physical objects to appropriate cross connect elements of said network;
   communications links between said management computer and said cross connect elements of said communications network for delivering said representations of physical objects;
   at least one terminal accessible to a user of virtual network for receiving virtual circuit requests from said user, wherein said requests are in terms of said logical objects; and
   communication means between said computer and said terminal for communicating said request to said computer.

2. The management system of claim 1, wherein said computer is further programmed to access a database representing elements of said circuit and existing circuit definitions.

3. The management system of claim 1, wherein said correlation programming correlates said end user's circuit definition in terms of bandwidth and end points to physical lines and termination points.

4. The management system of claim 1, wherein said representations of physical objects comprises connection commands.

5. The management system of claim 4, wherein said correlation programming correlates said termination points to connection points representing said cross connect elements.

6. The management system of claim 4, wherein said correlation programming correlates said user's circuit definition to logical path objects.

7. The management system of claim 6, wherein correlation programming correlates said user's circuit definition to logical path objects as an intermediate step.

8. A method of using a computer system to configure a multi-bandwidth network, comprising the steps of:
   receiving a bandwidth request specification in terms of a logical object and two or more end point objects;
   generating bandwidth correlations of said logical object and said end point objects to physical bandwidth object and termination points;
   generating group correlations of said termination points to physical connection points; and
   combining said set of line identifiers and said set of connection point identifiers to define a virtual circuit within said multi-bandwidth network.

9. The method of claim 8, and further comprising the step of communicating control messages to nodes of said communications network to establish connections for said virtual circuit.

10. The method of claim 8, and further comprising the step of comparing said line identifiers and said connection point identifiers against a database of possible configurations for said virtual circuit to determine the most efficient means for configuring said circuit.

11. The method of claim wherein said step of generating bandwidth correlations includes correlating intermediate logical objects representing network resources for transmission of information.

12. The method of claim 8, wherein said bandwidth objects comprise transmission lines.

13. The method of claim 8, wherein said bandwidth objects comprise transmission spans.

14. The method of claim 8, wherein said logical object comprises a circuit logical object.

15. The method of claim 8, wherein said logical object comprises a path logical object.

16. The method of claim 8, wherein said logical object comprises a channel logical object.

17. The method of claim 11, wherein said intermediate correlations include correlating said logical object to a set of logical path objects having path termination points, where two or more of said path termination points correspond to said end points, and correlating said path objects to a set of physical line identifiers having line termination points that correspond to said path termination points.

18. The method of claim 8, wherein said group correlation step includes correlating intermediate group logical objects to partitioned network resources.

19. The method of claim 18, wherein said intermediate group correlations include correlating termination points to a set of connection point objects involving different bandwidths, and correlating said connection points to a set of connection point identifiers corresponding to, or the same as said termination points.

20. The method of claim 8, wherein said step of receiving a bandwidth specification is accomplished by interpreting a request from a user via a communications link to a user terminal.

21. The method of claim 8, wherein said step of receiving a bandwidth specification is accomplished by interpreting a request from an administrator via an input device of a central computer system.

22. The method of claim 8, wherein said step of receiving a bandwidth specification is accomplished by automatically generating a specification in response to application programming which calls for a configuration process.

* * * * *

UNITED STATES PATENT AND TRADEMARK OFFICE
CERTIFICATE OF CORRECTION

PATENT NO. : 5,295,139

DATED : March 15, 1994

INVENTOR(S) : Craig A. Palmer

It is certified that error appears in the above-identified patent and that said Letters Patent is hereby corrected as shown below:

Column 5, line 19, after "such as", delete "ESC's" and insert -- ECS's --.

Column 6, line 19, delete "2" and insert -- 21 --.

Column 14, line 62, after "claim" insert -- 8, --.

Signed and Sealed this

Sixteenth Day of May, 1995

*Attest:*

*Attesting Officer*

BRUCE LEHMAN

*Commissioner of Patents and Trademarks*